US010806103B2

(12) United States Patent
Alfthan et al.

(10) Patent No.: US 10,806,103 B2
(45) Date of Patent: Oct. 20, 2020

(54) LOG PROCESSING HEAD

(71) Applicant: DEERE & COMPANY, Moline, IL (US)

(72) Inventors: Arto Alfthan, Tampere (FI); Lauri Palmroth, Tampere (FI)

(73) Assignee: DEERE & COMPANY, Moline, IL (US)

( * ) Notice: Subject to any disclaimer, the term of this patent is extended or adjusted under 35 U.S.C. 154(b) by 199 days.

(21) Appl. No.: 15/956,827

(22) Filed: Apr. 19, 2018

(65) Prior Publication Data

US 2018/0303046 A1 Oct. 25, 2018

(30) Foreign Application Priority Data

Apr. 20, 2017 (EP) ..................... 17167284

(51) Int. Cl.
*A01G 23/097* (2006.01)
*A01G 23/083* (2006.01)
*B27L 1/00* (2006.01)

(52) U.S. Cl.
CPC ......... *A01G 23/097* (2013.01); *A01G 23/083* (2013.01); *B27L 1/005* (2013.01)

(58) Field of Classification Search
CPC ........... B27L 1/00; B27L 1/005; A01G 23/08; A01G 23/083; A01G 23/095; A01G 23/097
See application file for complete search history.

(56) References Cited

U.S. PATENT DOCUMENTS

| 4,250,935 | A | 2/1981 | Helgesson et al. |
| 4,898,218 | A | 2/1990 | Linderholm |
| 7,677,116 | B2 | 3/2010 | Kaiser et al. |
| 9,554,524 | B2* | 1/2017 | Swinyard ............. A01G 23/095 |
| 2011/0265912 | A1 | 11/2011 | Arvidsson |
| 2012/0018043 | A1* | 1/2012 | Keskinen ............. A01G 23/083 144/34.1 |

FOREIGN PATENT DOCUMENTS

| WO | 0015025 A1 | 3/2000 |
| WO | 00115026 A1 | 3/2000 |
| WO | 2009157864 A1 | 12/2009 |
| WO | 2010081937 A1 | 7/2010 |
| WO | WO2013144450 A1 | 10/2013 |

OTHER PUBLICATIONS

European Search Report issued in counterpart European Patent Application No. 17167284.3 dated Oct. 11, 2017 (7 pages).

* cited by examiner

*Primary Examiner* — Matthew Katcoff

(57) ABSTRACT

A log processing head with a top knife and moveable feed means and delimbing and/or debarking means pushing a log against the top knife by means of actuators. In order to allow the top knife to follow the contour of the log without damaging a pin holding the knife, a pivot joint is used between the knife and the connection of the pin on the structure.

8 Claims, 4 Drawing Sheets

LOG PROCESSING HEAD

RELATED APPLICATIONS

This application claims priority to European Patent Application Ser. No. 17167284.3, filed 20 Apr. 2017, the disclosure of which is hereby expressly incorporated by reference in its entirety.

FIELD OF THE DISCLOSURE

The present disclosure relates to a log processing head having a structure, feed means and delimbing and/or debarking means, movably connected to the structure and adjustable by means of actuators and a knife connected to the structure by means allowing a determined movement due to the impact by a log and a method of control.

BACKGROUND OF THE DISCLOSURE

WARATAH processing heads type 626 have a top knife, which is moveably retained between rails, to move perpendicular to the longitudinal feeding direction of the log.

There is a need to improve functionality when logs of uneven shape are pulled along the top knife.

SUMMARY OF THE DISCLOSURE

In one embodiment there is provided flexibility to the knife to follow the contour of the log in the lateral direction, whereas in the radial direction it is kept in its position by the pin and the pivot joint. The term pivot joint is to be understood broadly and can mean a ball with a hole in it to receive the pin, or a ball received in a recess, like a ball- and socket joint, or a cardan joint and in all these cases allowing a pivot movement of the knife.

Various ways are possible to hold the pin (e.g., between ears, blocks, supports, bearings, or in cantilever fashion). It is important to provide enough stability for the rough working environment. In another embodiment the pin may be a bolt.

As only a small movement of the knife is needed to allow following the contour of the log, the knife is provided with longitudinal apertures receiving retainers bolted or welded to the structure or knife with some play, whereas the retainers or their heads keep the knife within its defined range of movement. While the play finally limits the movement of the knife, it does not affect the force on the pin in the radial direction. Aperture is meant to encompass any opening with a size bigger than the retainer, such that a relative movement is possible. So, this may be just a bigger bore, a straight slot, a curved slot, or the like.

In order to retain the knife properly on the structure, the knife may be provided with an arm or a recess to receive the pivot joint. The arm may be of any kind of extension connected to or being an integral part of the knife. Likewise, the recess for receiving (e.g. a ball kind pivot joint) can be in the structure of the knife itself or be formed in a concave or convex manner into its edge.

Depending on the available space the pin may be oriented in the direction of the travel direction of the log or transverse to it.

A concave knife encircles the log more than a flat knife and thus removes the bark and branches to a larger degree. As such a concave knife is forced by the log to move lateral when a warp occurs, the positive effect of having the pivot joint becomes even more apparent.

In addition to allowing the tilting movement of the knife, a signal derived from the bending forces acting onto the pin via a sensor is of higher accuracy. By using the pivot joint, the force is properly transferred to the pin and the sensor carried by it and no mechanical harm is caused to the pin and the sensor. The ball around the pin has the further advantage that the center of the pivot joint substantially coincides with the longitudinal axis of the pin and of the sensor.

It is made clear here, that the pin with or without the sensor allows the tilting movement of the knife.

While sensors to detect the force of the log onto the knife are known in the prior art, one known from WO 00/15025 reacts on and allows a movement of the top knife substantially linearly and one known from WO 2009/157864 takes the sensing movement from a pivotable delimbing knife in order to control the closing or opening of other knives along the moving log.

While many different technologies may be used to create a signal from an externally applied force, magnetoelastic, deflection based elastic force transducers, strain gauge types, hall-sensors or similar are useful kinds of sensors. In particular the sensor may be an off-the-shelf type commodity sensor, as it is offered (e.g. by BOSCH), or it may be a special sensor with certain characteristics created by its shape and/or material.

The sensor can be used in any variation of the pin orientation, independent, whether it is located on the knife or the structure. Also the pivot joint may be on the structure, the knife, in an arm or whatsoever.

While a signal generated by the sensor can be used for generating performance data, alerts, or the like, the performance of a log processor can be improved, when this signal is used to adjust the movable parts of the log processing head providing for the delimbing/debarking and feeding.

The performance, quality of cut, power requirement, etc. of an existing log processing head can be improved by a method using a high quality and unbiased signal created from the force a log exercises on a knife, like a top knife, and transmitted via a pivot joint.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments may include any combination of features from one or more dependent claims, and such features may be incorporated, collectively or separately, into any independent claim.

DETAILED DESCRIPTION

Figure 1:
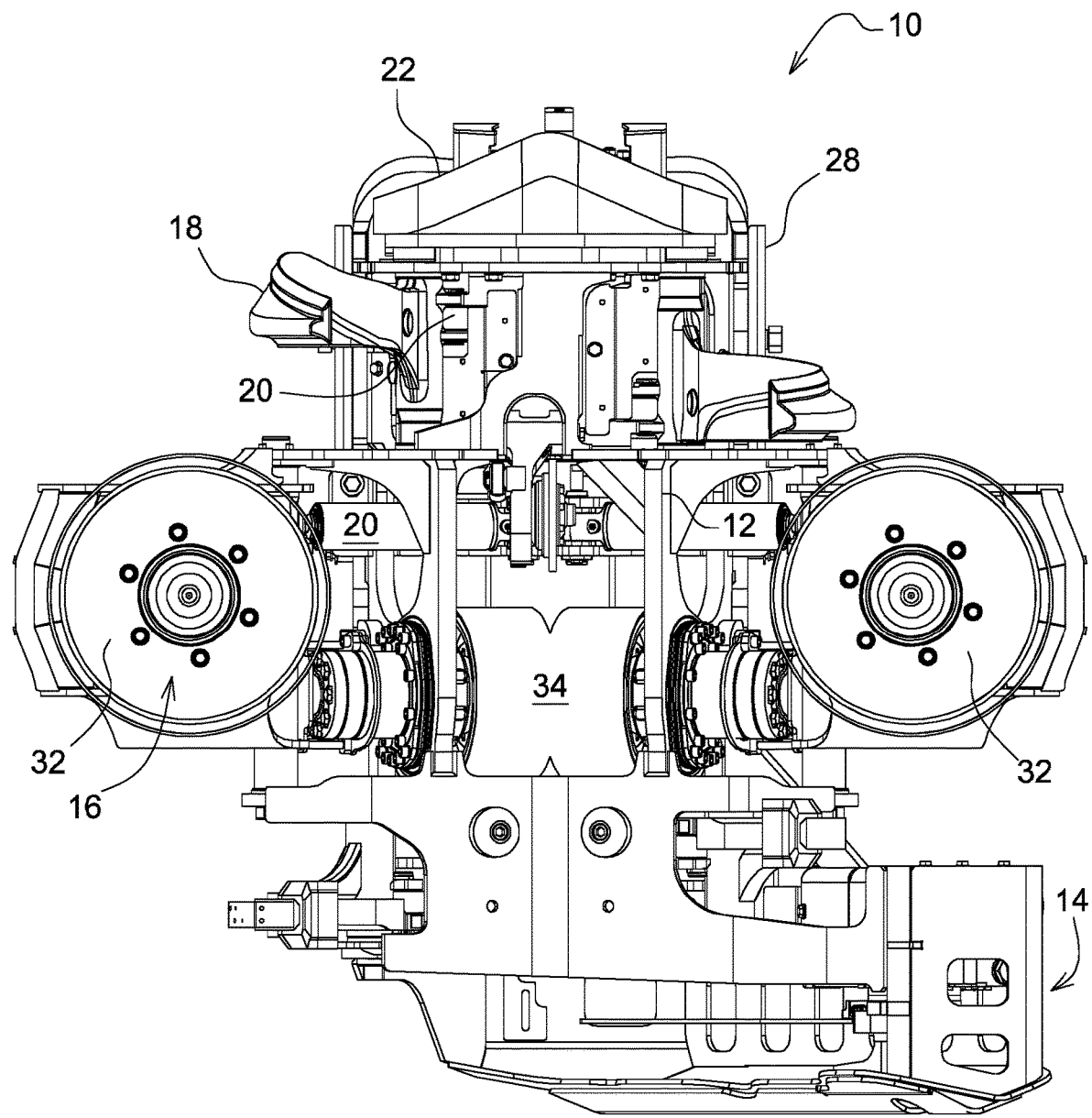
FIG. 1 is front view of a log processing head according to one embodiment.

A log processing head 10 shown in FIG. 1 comprises a structure 12, a saw box 14, feed means 16, pivotable delimbing and/or debarking means 18, actuators 20, a knife 22 and a control means 24 and is journaled about a horizontal axis 26 in a tilt frame 28.

The log processing head 10 is of the cut-to-length type and is attached in operation and transport to the free end of the boom of a harvester or other carrier vehicle. By means of such a log processing head 10, a log 48 (standing or already cut) is clamped against the structure 12 by means of the feed means 16 and pulled along the delimbing and/or debarking means 18 and knife 22 to cut off the branches and/or remove the bark. As the diameter of the log 48 decreases over its length, the positions of the feed means 16 and delimbing and/or debarking means 18 need to be adjusted continuously to remain in close contact with the log 48.

The structure 12 is made of welded or casted steel, as this is widely known (e.g. from WARATAH harvester heads model H415). Bearings, mounts, etc. are provided on the structure 12 to hold the feed means 16, delimbing and/or debarking means 18, knife 22, etc. Referring to FIG. 1, the upper end of the structure 12 is provided with a plate 30 or a similar part forming a surface for receiving the knife 22.

Figure 2:
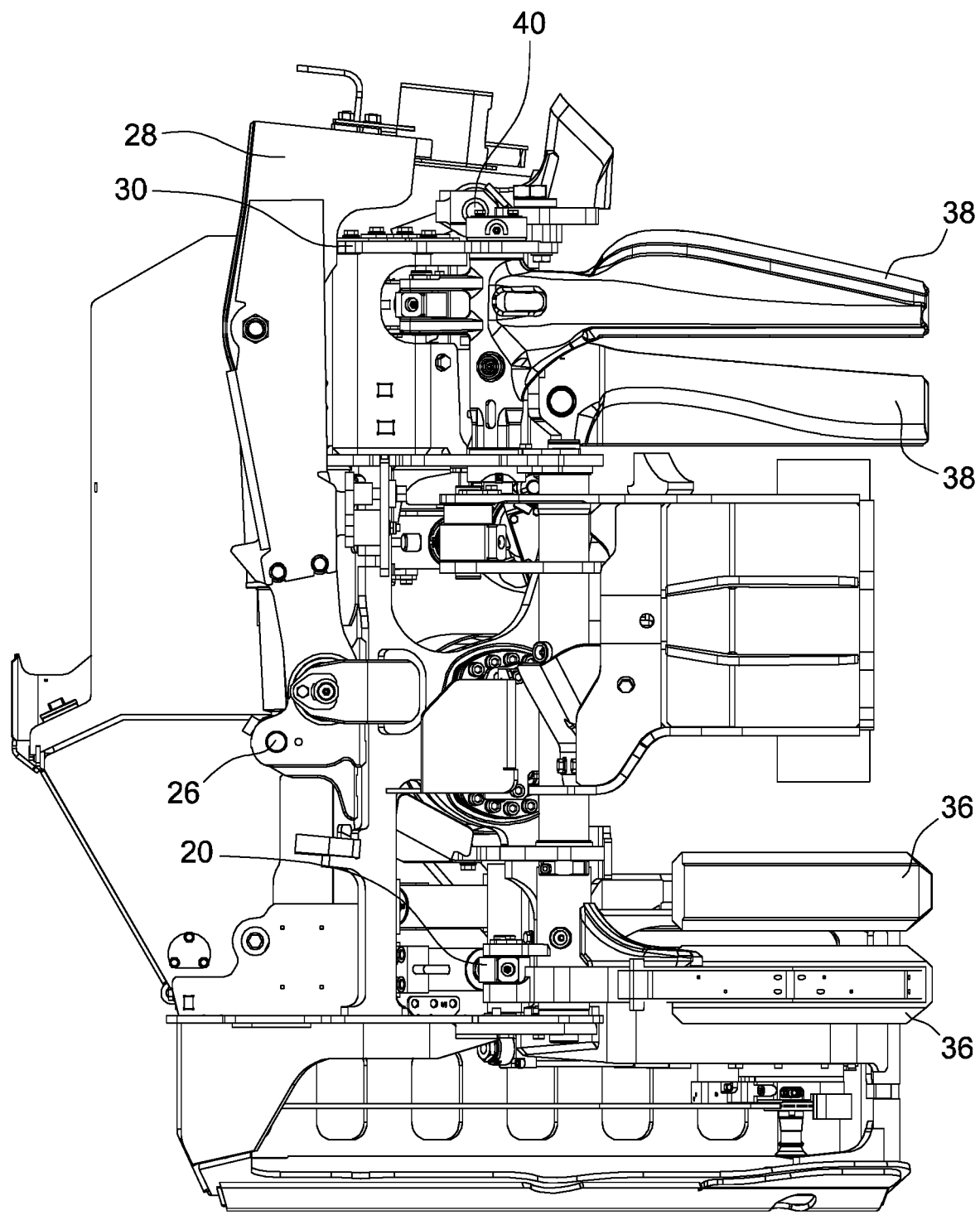
FIG. 2 is a side view of the log processing head of FIG. 1.

The saw box 14 is attached to the lower part of the structure 12 (FIG. 1 or 2) or is formed as an extension thereof. The saw box 14 houses a chain saw, by means of which the log 48 is cut into pieces.

The feed means 16 in the log processing head 10 shown comprises two outer feed wheels 32 and two inner feed wheels 34, all driven by hydraulic motors (not shown). The feed means 16 need to stay in close contact with the log 48, in order to transfer motion onto it for processing. Instead of in total 4 feed wheels 32, 34, also 2 or 3 feed wheels, or even revolving feed chains or longitudinally moving clamps could be used.

The delimbing and/or debarking means 18 in this embodiment comprise two lower pivotable knives 36 and two upper pivotable knives 38, each set being pivotable on the structure 12 and moved by actuators 20. However, one pair of knives 36 or 38 may suffice as well.

The actuators 20 normally are linear hydraulic cylinders applied with pressurized fluid to extend or retract, whereas the flow of this fluid is controlled via electromagnetic valves 46 per actuator 20. In the case of the feed means 16 the actuators 20 are linked with one end area to arms carrying the outer feed wheels 32 and with the other end area to the structure 12, to move the feed wheels 32 about unspecified bearings against the log. In the case of the pivotable knives 36, 38 the actuators are connected between the knives 36 or 38 of the respective set to control their movement via a link. Yet, the actuators 20 could also be connected between the structure 12 and the pivotable knives 36, 38, as both are known. Control of the actuators 20 may happen in different dimensions and following different rules or control logic.

The knife 22 is in the form of a so-called top knife and its shape facing the log 48 is of ordinary concave hat shape kind. The knife 22 is provided with a mounting flange 50, which is designed to rest against the plate 30 and which has two apertures 52, one on each side of its centerline 54, maybe half way between the center line 54 and the far most outer edge. These apertures 52 receive retainers 56 in the kind of bolts, studs, bosses, etc., which however are smaller than the apertures 52 to allow a movement of the knife 22 substantially along and inclined to its centerline 54. The retainers 56 have heads 66, like screw heads, holding the knife 22 against the plate 30, such that it is still moveable with little play. Dimensions of the apertures 52 and the retainers 56 allow a limited lateral tilting movement of the knife 22 about 5 to 15 degrees, as this is to be seen in FIG. 4 by the dashed lines. The dimension of the apertures 52 may be bigger than needed and adjustable stops may be used to adjust the tilt movement of the top knife 22. This tilting movement is caused by the shape of the log 48, when it is moved through the space between the structure 12 and the delimbing and/or debarking means 18. The knife 22 as shown in one example is also provided with an arm 58 at its side opposite the log contact area, welded to it and extending in the direction of the centerline 54. The arm 58 movably receives a pivot joint 60, whereas by means of a grease fitting 62 the movability between the arm 58 and the pivot joint 60 can be easily maintained. It should be clear, that the arm 58 could also be formed as an integral part or extension of the knife 22. Also, instead of an arm 58 whatsoever, a seat could be formed at a rear edge of the knife 22, in which the pivot joint 60 is received. However, the shown embodiment appears to be the most reliable and easy way to connect the pivot joint 60 to the knife 22. As it becomes very clear when looking onto FIG. 4, the pivot joint 60 performs a pivotal relative movement in the arm 58, once it tilts laterally with respect to the centerline 54.

Figure 4:
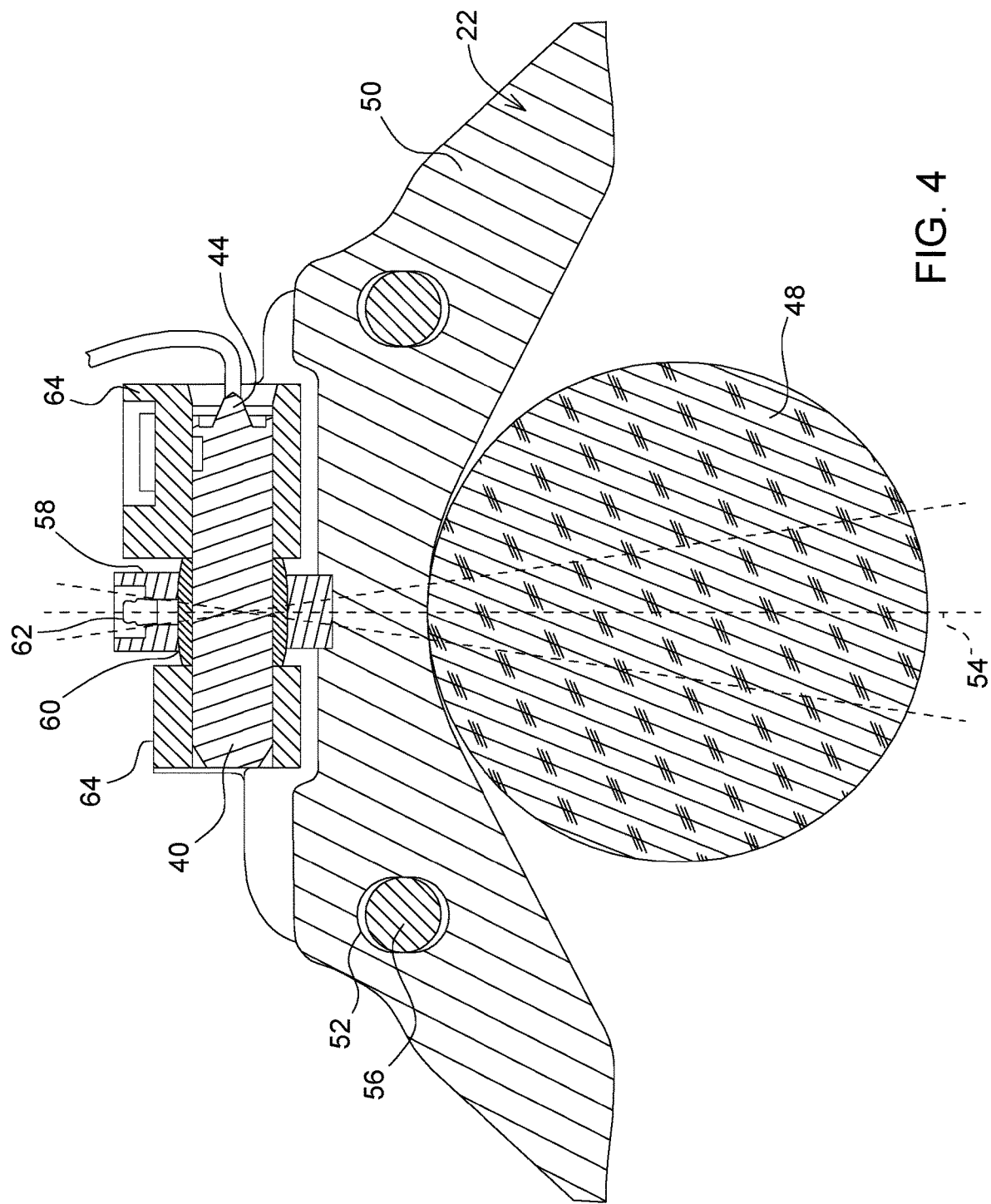
FIG. 4 is a section view of the log processing head of FIG. 1 with a knife on the top of the log processing head while clamping a log.

A pin 40 shown in this embodiment is retained with its respective end areas in two ears 64 fastened on the plate 30 and thus stiff with the structure 12 and distant from each other along the centerline of the pin 40. This pin 40 is applied in its free area radially by the stress from the log 48 pressed against it via the knife 22. The pivot joint 60 is sitting as a ball with a center bore on the pin 40 with minimal play in a space between the two ears 64. The orientation of the pin 40 as shown in FIG. 4 is such, that its longitudinal axis extends parallel to the main surface of the plate 30 and transverse to the feeding direction of the log 48. However, the orientation could also be perpendicular to the main surface of the plate 30 and in the feeding direction of the log 48. The pivot joint 60 could even be kept in a recess in the structure of the knife 22 itself, especially if the pin 40 is oriented along the feeding direction, whereas again the pivot joint 60 is located on a radial line of the log 48.

The control means 24 (FIG. 3) in a limited sense comprises a computer 42, a sensor 44 and valves 46, on a wider scale it also includes the actuators 20, an entire hydraulic and electric system for generating and delivering the energy and all components like a keyboard, monitor, etc. to allow an interface with an operator. It is the duty of the control means 24, among others, to keep the feed means 16 as well as the delimbing and/or debarking means 18 in a pre-defined close contact with the log 48, for which purpose it first senses the pressure under which the log 48 is pressed by the pivotable feed means 16 and the delimbing and/or debarking means 18 against the structure 12 and against the knife 22. A routine, or control logic, run by the computer 42 is designed such, that the pivotable delimbing and/or debarking means 18 are moved additionally against the log 48, as soon as the force of the log 48 acting onto the knife 22 gets below a certain threshold; the force is directed substantially radially with respect to the log cross section.

The axis 26 is oriented horizontally and allows the structure 12 to pivot from an upright position, in which it catches a standing tree to a substantially horizontal position, in which it processes the tree, i.e. delimbs and cuts.

The tilt frame 28 of an inverted U-shape is the connection between a boom of a carrier vehicle and the structure 12 and well known.

The sensor 44 in this embodiment is integrated into the pin 40 and can be formed to react on the deflection of the pin 40 caused by the force applied by the knife 22. Useful types could be magnetoelastic, deflection based elastic force transducers, strain gauge types, hall-sensors or similar are useful kinds of sensors. The sensor 44 may have a cable for connection to the computer 42 or may transmit a signal wirelessly.

Starting from the structural description above, the control means 24 operates as follows.

Figure 3:
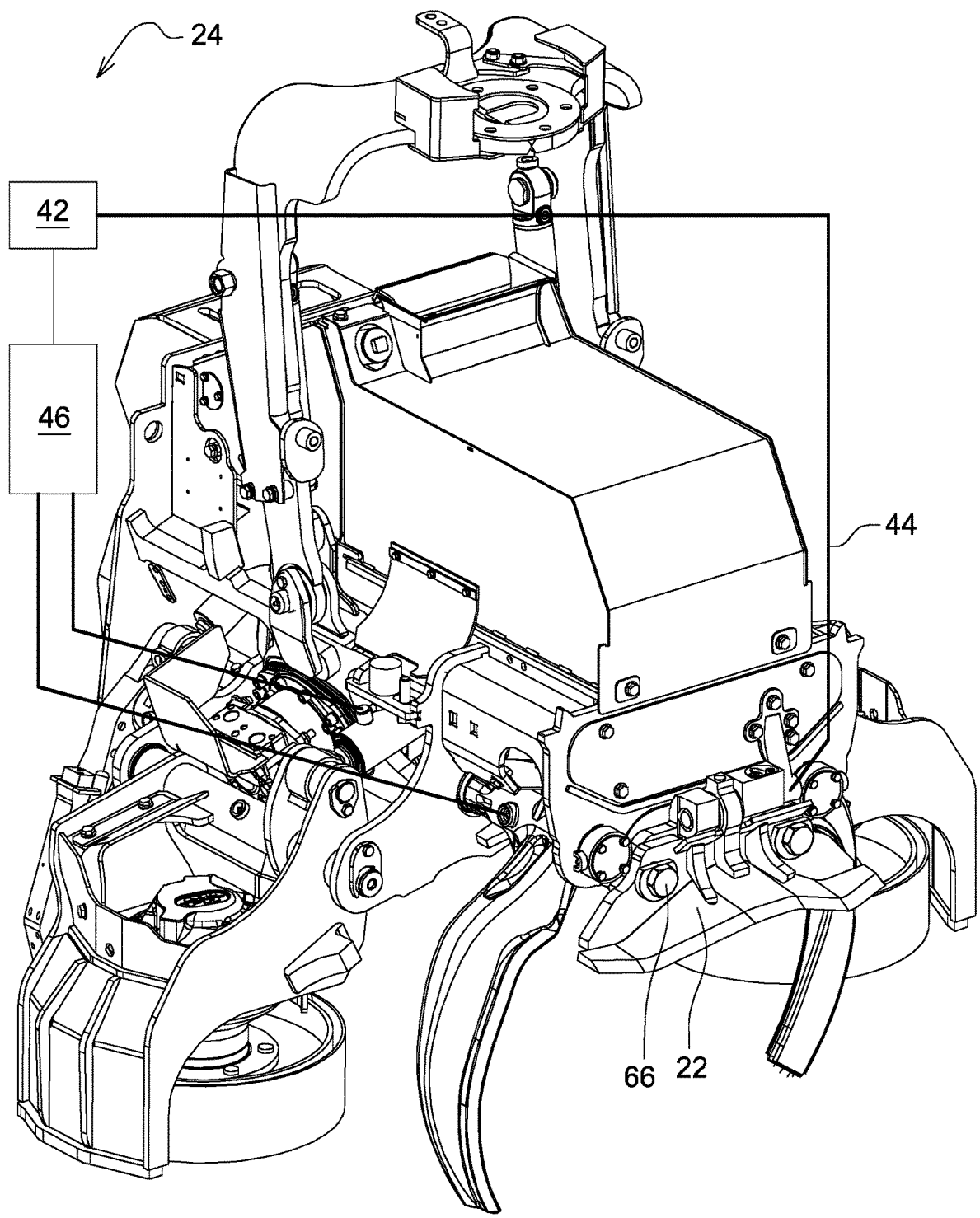
FIG. 3 is a perspective view of the log processing head of FIG. 1 shown in a downward delimbing position.

Once a log 48 shall be harvested or processed, it will be clamped in the space between the structure 12 and knife 22 on one side and the feed means 16 and delimbing and/or debarking means 18 on the other side under a force suitable to move the log 48 without slippage at the feed means 16 to shear off the branches of the log 48. For this purpose the structure 12 pivots about axis 26 in the tilt frame 28 to assume the horizontal position as shown in FIG. 3, thereby the feed means 16 and delimbing and/or debarking means 18 being around the log 48 and holding it against gravitation. In this position the knife 22 is located above the log 48. Due to the clamping force applied by the actuators 20 through the feed means 16 and delimbing and/or debarking means 18 onto the log 48, the log 48 exercises an upwardly oriented radial force onto the knife 22 retained on the plate 30. The knife 22 will move in the lateral direction to the extent allowed by the apertures 52 and press radially to the log onto the pin 40 and thus the sensor 44 by means of the arm 58 and the pivot joint 60. Even if the knife 22 tilts slightly, as this is shown by the lateral dashed lines in FIG. 4, this does not change the position of the pivot joint 60 on the pin 40 and will not have a mechanical impact on its surface or the accuracy of the signal generated by the sensor 44. The force recognized by the sensor 44 is transmitted as a signal to the computer 42, which—based on internal data—adjusts the pressure of the actuators 20 needed to have sufficient contact between the feed means 16, namely feed wheels 32, 34, and the delimbing and/or debarking means 18, the log 48 and the knife 22. As the log diameter decreases over its length, the sensor 44 will sense less stress along the moving log 48 and the computer 42 will send a signal to the valves 46, causing the actuators 20 to extend, until a certain force is applied onto the knife 22 by the log 48.

The invention claimed is:

1. A log processing head comprising:
a structure;
feed means and at least one of a delimbing and a debarking means, movably coupled to the structure and adjustable by means of an actuator;
a knife having a centerline and defining two apertures positioned on each side of the centerline, the knife coupled to the structure by receiving retainers through the apertures and the structure, the retainers being smaller than the apertures to allow movement of the knife due to the impact by a log;
a pin coupled to at least one of the structure and the knife; and
a pivot joint between the knife and the structure retained on the pin.

2. The log processing head of claim 1, wherein the aperture and the retainer allow a limited lateral tilting movement of the knife of five to fifteen degrees.

3. The log processing head of claim 1, wherein the knife is provided with at least one of an arm and a recess to receive the pivot joint.

4. The log processing head of claim 1, wherein the pin is oriented at least one of in the travel direction of the log and transverse to the log.

5. The log processing head of claim 1, wherein the knife has a concave shape with the center with the pivot joint on a radial line of the log.

6. The log processing head of claim 1, wherein a sensor is coupled to the pin, the sensor creating a signal depending on the bending forces acting on the pin.

7. The log processing head of claim 6, wherein the sensor is at least one of a magnetoelastic, a deflection based elastic force transducer, and a strain gauge type.

8. The log processing head of claim 6, further comprising control means for operating at least one of the actuators of the feed means, the delimbing means, and the debarking means depending on the signals received from the sensor.

* * * * *